United States Patent
Theimer

(10) Patent No.: US 7,502,931 B2
(45) Date of Patent: Mar. 10, 2009

(54) METHOD AND DEVICE FOR AUTHENTICATING A USER ON A REMOTE SERVER

(75) Inventor: Wolfgang Theimer, Bochum (DE)

(73) Assignee: Nokia Corporation, Espoo (FI)

( * ) Notice: Subject to any disclaimer, the term of this patent is extended or adjusted under 35 U.S.C. 154(b) by 621 days.

(21) Appl. No.: 10/475,929

(22) PCT Filed: Apr. 4, 2002

(86) PCT No.: PCT/IB02/01085
§ 371 (c)(1), (2), (4) Date: Apr. 30, 2004

(87) PCT Pub. No.: WO02/089400
PCT Pub. Date: Nov. 7, 2002

(65) Prior Publication Data
US 2004/0181674 A1    Sep. 16, 2004

(30) Foreign Application Priority Data
Apr. 26, 2001   (EP)   ................ 01110347

(51) Int. Cl.
*H04L 9/00* (2006.01)

(52) U.S. Cl. .................... 713/171; 380/277

(58) Field of Classification Search .......... None
See application file for complete search history.

(56) References Cited

U.S. PATENT DOCUMENTS

| | | | |
|---|---|---|---|
| 6,112,078 A | 8/2000 | Sormunen et al. | |
| 6,182,229 B1 | 1/2001 | Nielsen | |
| 6,292,833 B1* | 9/2001 | Liao et al. | 709/229 |
| 6,519,241 B1* | 2/2003 | Theimer | 370/338 |
| 7,054,626 B2* | 5/2006 | Rossmann | 455/422.1 |
| 2002/0132605 A1* | 9/2002 | Smeets et al. | 455/411 |
| 2005/0094201 A1* | 5/2005 | Gecht et al. | 358/1.15 |

FOREIGN PATENT DOCUMENTS
WO    9956520    11/1999

* cited by examiner

*Primary Examiner*—Pramila Parthasarathy
(74) *Attorney, Agent, or Firm*—Ware, Fressola, Van Der Sluys & Adolphson

(57) ABSTRACT

A method is provided for authenticating a user (10) on a remote server 16a, 16b, 16c of a network 18, comprising the steps of receiving an authentication request from said remote server 16a, 16b, 16c of said network 18 by a terminal device 14, retrieving a respective authentication key from a personal trusted device 12 in which a plurality of network addresses of remote servers 16a, 16b, 16c and corresponding authentication keys are stored in a database, and displaying said authentication key to the user 10 on said personal trusted device 12.

21 Claims, 2 Drawing Sheets

METHOD AND DEVICE FOR AUTHENTICATING A USER ON A REMOTE SERVER

CROSS-REFERENCE TO RELATED APPLICATION

This application is the U.S. National Stage of International Application PCT/IB02/01085 filed Apr. 4, 2002 which in turn claims priority from European Application 01110347 filed Apr. 26, 2001.

BACKGROUND OF THE INVENTION

1. Technical Field

The present invention relates to the authentication of a user on a remote server in a network, requiring an authentication key to allow for access to its services. In particular the invention relates to automatic password retrieval and access control.

2. Discussion of Related Art

The amount of access control points on remote servers in a network such as the internet grows tremendously. Authentication is important to enable safe transactions over open channels which can easily be distorted or recorded for spying. A typical concept of allowing for access is to provide an authentication key to the user such as a user login name and a corresponding password, or a personal identification number (PIN), which is a somewhat simpler means. Due to the large number of access control points, it is difficult for the user to memorize all different access control information. Very often users try to bypass this problem by using the same login name and password or PIN for all relevant sites, which solution obviously compromises security, because figuring out the authentication key of one of those sites would imply that all other sites are open for unwanted access as well.

U.S. Pat. No. 6,182,229 discloses a client system operated by a user having access to a plurality of remote servers requiring passwords for access. The client system maintains a database of encrypted passwords and user identifications for remote servers to which the user is inscripted. The access to the database is protected by a master password. In such a system the user has to remember one master password only, and passwords of the remote servers might be chosen at random to enhance security.

U.S. Pat. No. 6,112,078 discloses a method for obtaining at least one item of a user authentication key, wherein the user authentication key is obtained at least partly by using paging or short message service (SMS) messages. If the user needs to recall an authentication key he may request an external information service secured by a password.

Both methods suffer from a major security problem, since the databases containing the information of all passwords and user identifications for remote servers to which the user is inscripted are connected to a public communication network and may be accessed from a remote server. Thus it will be sufficient to break the single master password so as to gain access to all network addresses and the corresponding authentication keys for remote servers to which the user is inscripted. Not only the authentication keys, but also the important information to which remote servers the user is inscripted, may thus be obtained.

DISCLOSURE OF INVENTION

The object of the present invention is therefore to provide a more secure method for retrieving information about authentication keys of a user for remote servers to which the user is inscripted.

Accordingly, the present invention provides a method for authenticating a user on a remote server of a network. It comprises the steps of receiving an authentication request from one remote server of the network by a terminal device, retrieving respective authentication keys from a personal trusted device in which a plurality of network addresses and respective authentication keys are stored in a database; and displaying the authentication key to the user on the personal trusted device.

The network might be any network, such as the internet, a mobile communication network, or an intranet comprising a client server or terminal device used by the user and at least one remote server rendering access to his data and services by authentication of the user only. The user might store multiple network addresses, preferably.a uniform resource locator (URL) e.g. an address starting with "http" or "https" or a uniform resource identifier (URI) and the corresponding authentication keys that preferably are a user login name and a corresponding password or a personal identification number. Hence, he is enabled to choose his authentication on different remote servers at random, thus enhancing the security of access to the plurality network addresses. The information is stored in a personal trusted device, only accessible to the user. If an authentication request from one remote server of the network is received by the terminal device, the address and/or name of the remote server is transferred to the personal trusted device.

In a preferred embodiment of the present invention, the method further comprises a step of encryption before information about network addresses and the corresponding authentication keys are stored on the personal trusted device. Likewise the authentication keys retrieved from the database are decrypted before being displayed to the user in the personal trusted device. This step along with the above following embodiments of the present invention assures that all relevant information stored on the personal trusted device are difficult to retrieve without having the user's access rights on the personal trusted device.

In another preferred embodiment of the present invention, the method further comprises the step of requesting a user's authentication to start the authentication key retrieval on the personal trusted device. This steps ensures, that even if a person other than the user has got access to the personal trusted device, he must provide an authentication only known to the user to get relevant information about the network addresses of remote servers the user is inscripted to, and the corresponding user login names and passwords.

Yet in another embodiment of the present invention, the authentication key retrieval is closed automatically, if it remains inactive for a predetermined period of time. If the user loses the portable trusted device or leaves the application key retrieval running while another person is having access to the personal trusted device, it is thus ensured, that the application key retrieval is closed automatically, in most cases before any relevant information can be corrupted or compromised.

Still in another embodiment of the present invention, the step of retrieving the authentication keys is carried out upon transmitting the network address of the remote server to the personal trusted device. The transmission might be automatically thus providing an easy application of the method according the present invention to the user. She need not have to transfer the network address to the personal trusted device which might be cumbersome, if the address is a long string of numbers or symbols.

According to another aspect of the invention, a computer program is provided, by which implementation a software method for authenticating a user on a remote server of a network can be executed. By using a computer program for the execution of the method for authenticating a user on a remote server of a network, the method can easily be implemented in a computer or in a personal trusted device. Preferably the computer program is implemented as a Java application or applet. This favourable implementation is chosen so as to enable the computer program to be run on different devices and to enable already sold devices to be upgraded with the authentication key retrieval, e.g. by simply downloading the applet from a remote server on the Internet.

According to another aspect of the invention, a computer program product is provided, that contains a computer readable medium which stores a program for the execution of a method for authenticating a user on a remote server of a network.

According to yet another aspect of the invention, a personal trusted device is provided, comprising a storage means for storing a plurality of network addresses and respective authentication keys in a database, an authentication key retrieval means for retrieving a respective authentication key from the database upon entry of a network address, and a display for displaying the retrieved authentication key.

Preferably, the personal trusted device is a mobile communication device such as a mobile phone or a paging device such as a pager. A mobile device is favorable since it assures that the personal trusted device is strictly user owned and can be transported by the user to any place, if desired. Thus the authentication key retrieval might be available to the user, whatever terminal device connected to the network he is using.

According to a fourth aspect of the present invention, a communication network is provided comprising at least one terminal device, an access point in communication for the terminal device and forming part of the network and a personal trusted device. Such a communication network might be a personal computer system connected via the internet to a remote server, such as the server of a bank, an insurance, an e-commerce provider, etc. Yet it might be a mobile communicator having access via a wireless telecommunication network to an access point, that is connected to the internet.

Preferably, the terminal device is connected to the personal trusted device. This might be done either by a wired link or by a wireless connection. Preferably, the wireless connection is achieved by a Bluetooth connection, an infrared connection or an ultraviolet connection. Connecting the terminal device by a wired link or wireless connection to the personal trusted device is arranged to ease the transfer of the internet address of the remote server requesting for an authentication key from the terminal device to the portable device. Favorably, this connection is only one-way directed, only allowing for transferring information from the terminal device to the portable trusted device. It is a major feature of the present invention, that information stored on the portable trusted device is merely displayed to the user, who has to transfer it to the terminal device. This step enhances security.

In another additional embodiment, the database containing a plurality of internet addresses and corresponding authentication keys may be transferred from one personal trusted device to another, a procedure that might be necessary if the existing personal trusted device is replaced by a new device or if it is used in parallel with a second device. An emerging standard for data interchange is SyncML, an XML based approach for data synchronization and interchange. Yet it should be noted, that a data transfer to another device involves major security problems. Therefore a simple protection against data corruption may be a transfer of the database to another personal trusted device by a subscriber identity module (SIM) card or a memory card having a storage means for storing the database, that can be transferred from one device to the other, or a transfer that is only allowed, if the SIM cards of both devices are conjoined. The memory or SIM card can store the database also permanently and is accessed by different personal trusted devices of the same user when the card is connected to this personal trusted device.

In any case such a transfer should be secure and it is noted that there exist many possible ways to insure a safe transfer known to a person skilled in the art.

It should be noted that the description so far has been related to a terminal device connected to a remote server via a network. This terminal device can be a personal computer which might be located in private housings, offices, or public spaces and so forth. Yet, in another possible embodiment of the present invention, the terminal device may be a cash retrieval device such as an ATM connected to a bank remote server or any other commercial device delivering a service or a value, which device does not necessarily have to be connected to a remote server (i.e. the terminal device and the remote server are identical) provided that an authentication of the user is requested before delivering a service or value.

BRIEF DESCRIPTION OF THE DRAWINGS

A more complete appreciation of the invention and many other attendant advantages thereof will be readily obtained, as the same becomes better understood by reference to the following detailed description when considered in connection with the accompanying drawings, wherein.

BEST MODE FOR CARRYING OUT THE INVENTION

Figure 1:
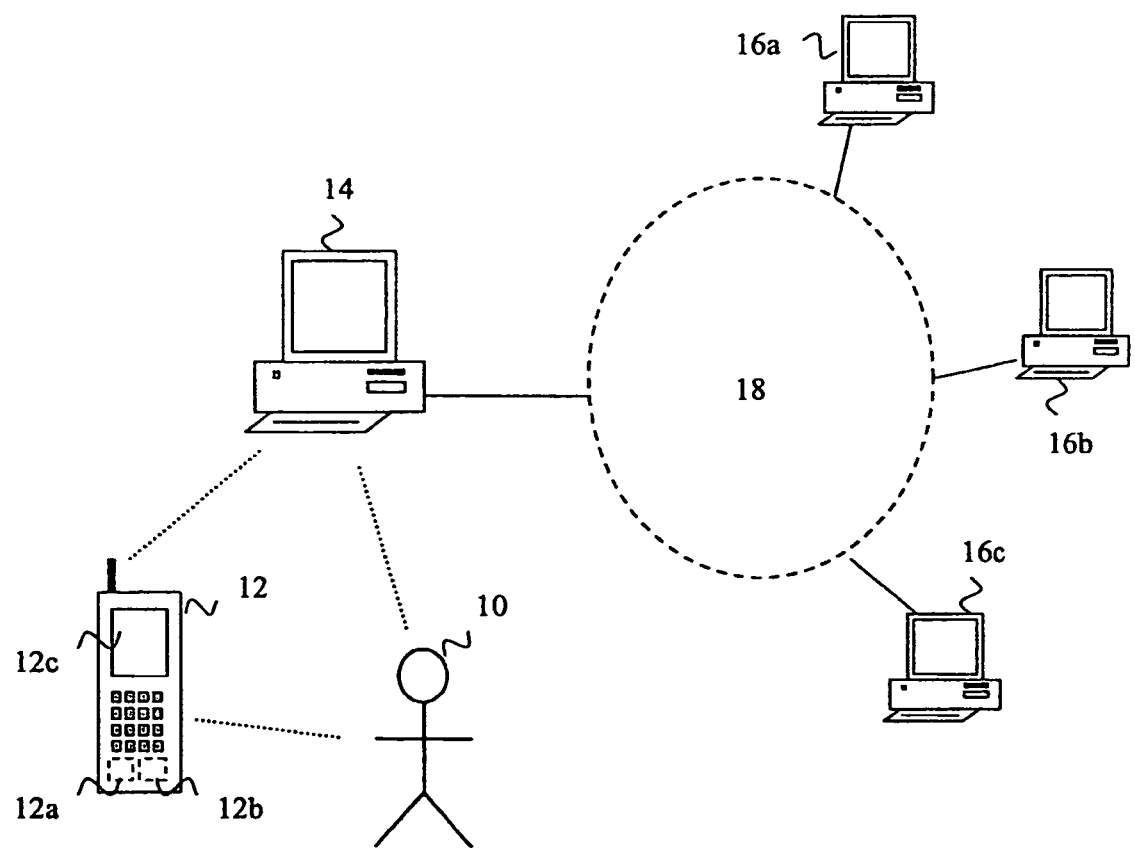
FIG. 1 shows a block diagram of a user retrieving an authentication key to access a remote server.
Figure 2:
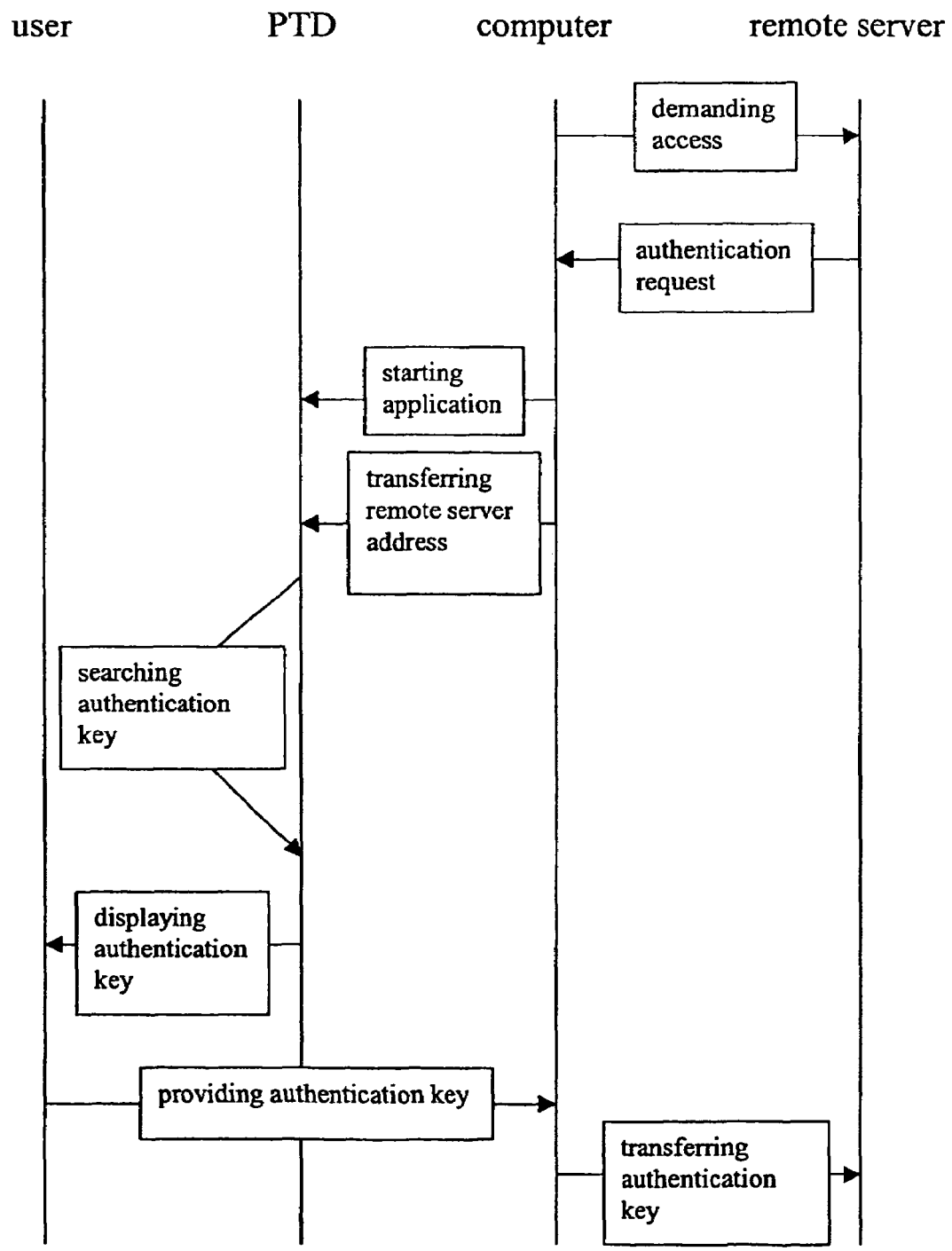
FIG. 2 shows a diagram of a preferred embodiment of the method according to the present invention.

As shown in FIG. 1, a user 10 having a personal trusted device 12, comprising a storage means 12a, an authentication retrieval means 12b and a display 12c, is requiring access to a remote server 16a, 16b, 16c by using a terminal device 14, the remote server 16a, 16b, 16c and the terminal device 14 being connected via a network 18. By simultaneously referring to FIG. 2, the method of authentication key retrieval will now be explained. In response for instance to an access demand, the remote server 16a, 16b, 16c is requiring a user authentication to allow for an access to its services and/or information. According to a preferred embodiment of the present invention, the remote server 16a, 16b, 16c is sending its authentication request via the network 18 to the terminal device 14. The terminal device 14 prompts the authentication request to the user 10. The user 10 then starts the authentication key retrieval on the personal trusted device 12 and transfers the internet address or the URL of the remote server 16a, 16b, 16c requesting for authentication to the personal trusted device 12, in order to retrieve the corresponding authentication key.

In another embodiment of the present invention the terminal device 14 and the personal trusted device are connected, either by a wired link or by a wireless connection such as bluetooth, IR- or UV-connection. In this case, the authentication key retrieval may be started directly on the personal trusted device 12 by the terminal device 14, if an authentication request is prompted, and the transfer of the internet address or the URL of the remote server 16a, 16b, 16c requesting for authentication to the personal trusted device 12 may be transferred automatically to the personal trusted device. After the internet address or URL of the remote server 16a, 16b, 16c requesting for authentication to the personal trusted device 12 is transferred to the personal trusted device 12, the corresponding authentication key is searched in the database on the personal trusted device 12. If it is found, the corresponding authentication key is displayed on a display (12c) of the personal trusted device to the user 10, who may provide the authentication key to the terminal device 14, from where it is transferred to the remote server 16a, 16b, 16c.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered as illustrative, but not restricting. Thus, the possibilities of implementing and using the invention are only restricted by the enclosed claims. Consequently, various options of implementing the invention as determined by the claims, including equivalent implementations, also belong to the scope of the invention.

The invention claimed is:

1. Method for use by a personal trusted device, comprising:
    receiving from a terminal device a network address of a remote server, said network address being provided by the remote server to the terminal device in an authentication request,
    retrieving a respective authentication key of said remote server, wherein a plurality of network addresses of remote servers and corresponding authentication keys are stored in a database of said personal trusted device, and
    displaying said retrieved authentication key on said personal trusted device,
    wherein said retrieved authentication key is provided to the terminal device by a user of the terminal device for authenticating said user on said remote server.

2. Method according to claim 1, where said authentication keys are a user login name and a password.

3. Method according to claim 1, where said authentication key is a personal identification number.

4. Method according to claim 1, where said network addresses are uniform resource locations or uniform resource identifiers.

5. Method according to claim 1, wherein:
    said network addresses and said corresponding authentication keys are encrypted before storing in said database on said personal trusted device, and
    said authentication key retrieved from said database on said personal trusted device is decrypted before displaying it to the user on said personal trusted device.

6. Method according to claim 1, further comprising:
    requesting the user's authentication before retrieving the respective authentication key.

7. Method according to claim 1, wherein the authentication key retrieval is closed automatically, if said personal trusted device remains inactive for a predetermined period of time.

8. A computer program product comprising a computer readable storage medium storing program codes thereon for used by a personal trusted device, wherein the program codes comprise:
    instructions for receiving from a terminal device a network address of a remote server, said network address being provided by the remote server to the terminal device in an authentication request,
    instructions for retrieving a respective authentication key of said remote server, wherein a plurality of network addresses of remote servers and corresponding authentication keys are stored in a database of said personal trusted device, and
    instructions for displaying said authentication key on said personal trusted device,
    wherein said authentication key is provided to the terminal device by a user of the terminal device for authenticating said user on said remote server.

9. Computer program according to claim 8, implemented as a Java applet.

10. Computer program product of claim 8, wherein said program product is run on a computer or a mobile terminal device.

11. Personal trusted device, comprising:
    a memory, configured to store a plurality of network addresses and respective authentication keys in a database,
    an authentication key retriever, configured to retrieve a respective authentication key from said database upon entry of a network address of a remote server, and
    a display, configured to display said retrieved authentication key,
    wherein said network address is provided by said remote server to a terminal device in an authentication request,
    wherein said network address is transferred from said terminal device to said personal trusted device, and
    wherein said retrieved authentication key is provided to the terminal device by a user of the terminal device for authenticating said user on said remote server.

12. Personal trusted device according to claim 11, wherein said personal trusted device is a mobile terminal device.

13. Personal trusted device according to claim 11, wherein said personal trusted device is a paging terminal device.

14. Communication network, comprising:
    at least one terminal device,
    an access point in communication with said terminal device and forming part of a network, and
    a personal trusted device,
    wherein said personal trusted device comprises:
        a memory, configured to store a plurality of network addresses and respective authentication keys in a database,
        an authentication key retriever, configured to retrieve a respective authentication key from said database upon entry of a network address of said access point, and
        a display, configured to display said retrieved authentication key,
    wherein said network address is provided by said access point to said terminal device in an authentication request,
    wherein said network address is transferred from said terminal device to said personal trusted device, and wherein said retrieved authentication key is provided to the terminal device by a user of the terminal device for authenticating said user with said network.

15. Communication network according to claim 14, where said terminal device is connected to said personal trusted device by a wired link.

16. Communication network according to claim 14, where said terminal device has a wireless connection to said personal trusted device.

17. Communication network according to claim 16, where said terminal device is connected to said personal trusted device by a bluetooth connection.

18. Communication network according to claim 16, where said terminal device is connected to said personal trusted device by an infrared connection.

19. Communication network according to claim 16, where said terminal device is connected to said personal trusted device by an ultraviolet connection.

20. A personal trusted device apparatus, comprising:
    means for storing a plurality of network addresses and respective authentication keys in database,
    means for retrieving a respective authentication key from said database upon entry of a network address of a remote server, and
    means for displaying said retrieved authentication key,
    wherein said network address is provided by said remote server to a terminal device in an authentication request,
    wherein said network address is transferred from said terminal device to said apparatus, and
    wherein said retrieved authentication key is provided to the terminal device by a user of the terminal device for authenticating said user on said remote server.

21. A communication network, comprising:
    at least one terminal device,
    an access point in communication with said terminal device and forming part of a network, and
    a personal trusted device,
  wherein said personal trusted device comprises:
    means for storing a plurality of network addresses and respective authentication keys in a database,
    means for retrieving a respective authentication key from said database upon entry of a network address of a remote server, and
    means for displaying said retrieved authentication key,
    wherein said network address is provided by said remote server to a terminal device in an authentication request,
    wherein said network address is transferred from said terminal device to said personal trusted device, and
    wherein said retrieved authentication key is provided to the terminal device by a user of the terminal device for authenticating said user on said remote server.

* * * * *

UNITED STATES PATENT AND TRADEMARK OFFICE
CERTIFICATE OF CORRECTION

PATENT NO. : 7,502,931 B2  Page 1 of 1
APPLICATION NO. : 10/475929
DATED : March 10, 2009
INVENTOR(S) : Wolfgang Theimer It is certified that error appears in the above-identified patent and that said Letters Patent is hereby corrected as shown below:

In column 6, line 11, "." should be --,--.

In column 6, line 13, "." should be --,--.

In column 7, line 2, "tenninal" should be --terminal--.

Signed and Sealed this

Twenty-first Day of April, 2009

JOHN DOLL
*Acting Director of the United States Patent and Trademark Office*